July 23, 1935. A. O. JAEGER 2,008,761
PROCESS AND APPARATUS FOR PRODUCING SULPHUR TRIOXIDE
Filed June 22, 1931 2 Sheets-Sheet 1
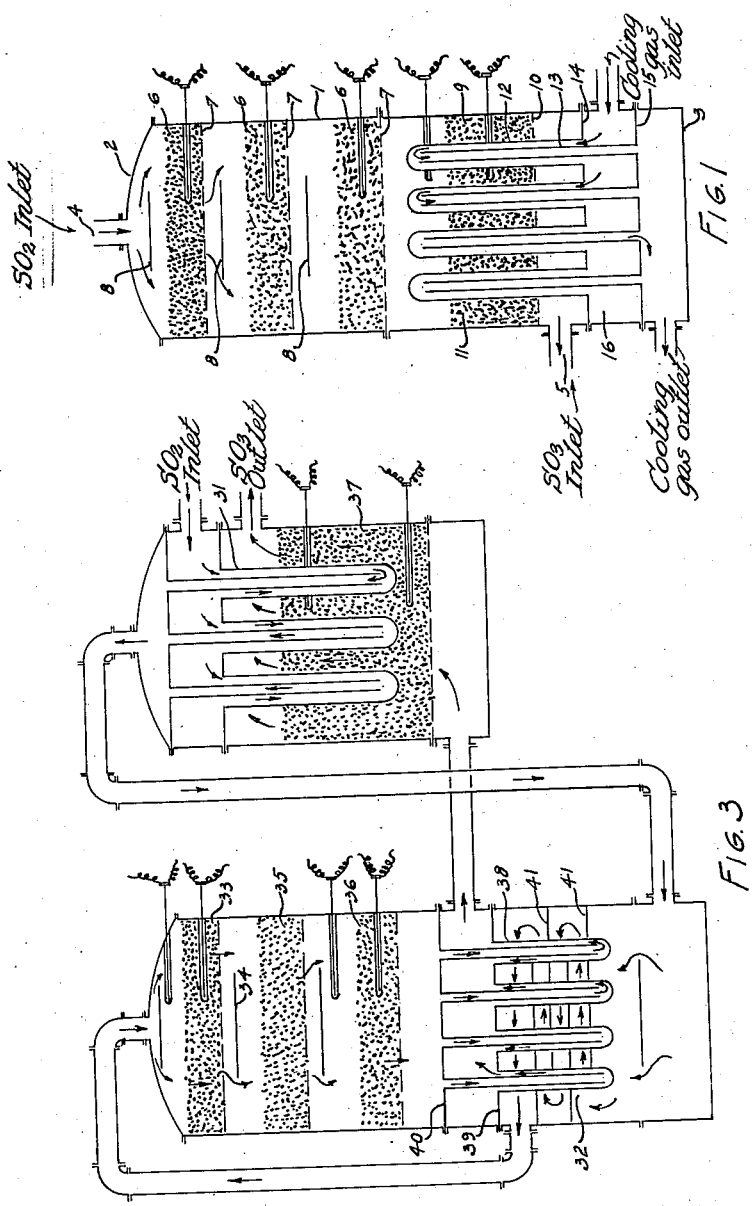
INVENTOR
ALPHONS O. JAEGER
BY Robert Ames Morton
ATTORNEY July 23, 1935.  A. O. JAEGER  2,008,761
PROCESS AND APPARATUS FOR PRODUCING SULPHUR TRIOXIDE
Filed June 22, 1931  2 Sheets-Sheet 2
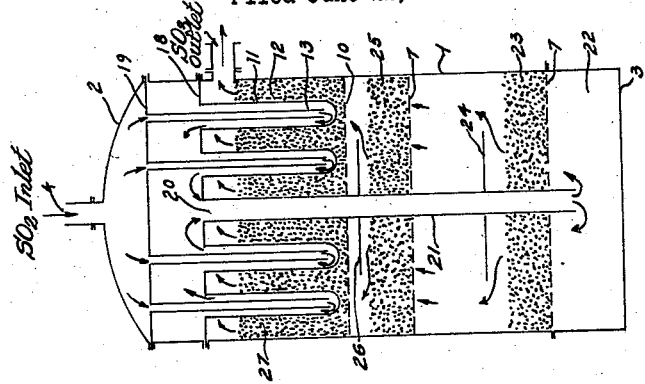
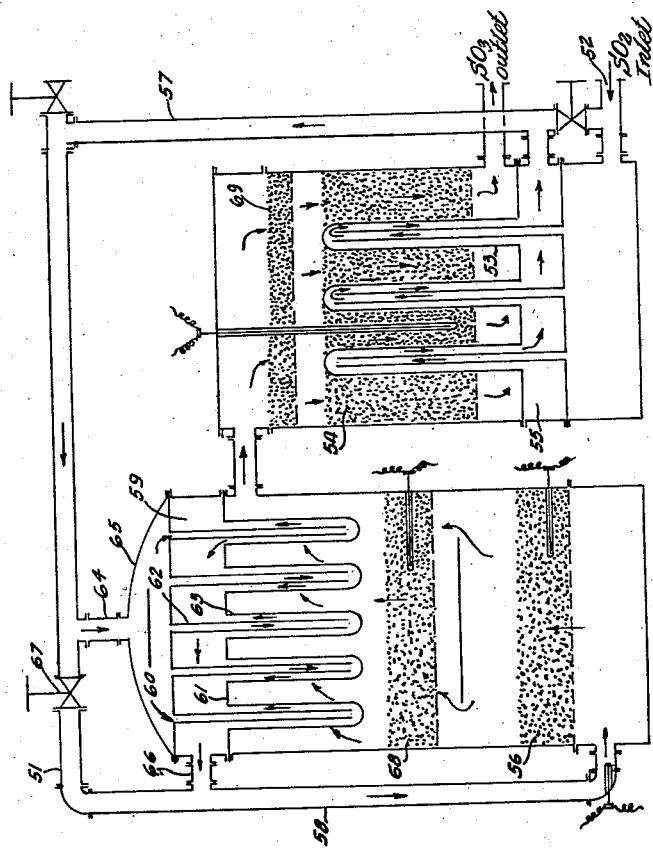
INVENTOR
ALPHONS O. JAEGER
BY Robert Ames Norton
ATTORNEY Patented July 23, 1935

2,008,761

UNITED STATES PATENT OFFICE 2,008,761

PROCESS AND APPARATUS FOR PRODUCING SULPHUR TRIOXIDE

Alphons O. Jaeger, Mount Lebanon, Pa., assignor, by mesne assignments, to American Cyanamid & Chemical Corporation, a corporation of Delaware Application June 22, 1931, Serial No. 546,065

6 Claims. (Cl. 23—176)

This invention relates to process and apparatus for producing sulphur trioxide by the catalytic oxidation of sulphur dioxide with air or other oxygen-containing gases, and more specifically to such processes and apparatus in which a plurality of converters or catalyst layers are used.

An object of the invention is to obtain increased outputs and a proper temperature regulation by a process permitting the use of much simpler and cheaper apparatus than that hitherto considered necessary for this purpose. A further object is to provide a system which will make full use of overload capacity of the modern, highly active, non-platinum catalysts with a marked reduction in the complexity and cost of installation and greater ease in removing and replacing the catalyst. Other objects of the invention will be in part apparent from the following description, taken in connection with the annexed drawings and will be in part pointed out in the appended claims.

In the past, processes for the catalytic oxidation of sulphur dioxide have been developed with the aid of converter systems of two general types; the Knietsch type in which all portions of the catalyst are subjected to positive cooling in order to insure a controlled temperature gradient and the Grillo or layer type of converter in which the catalyst itself is not positively cooled but the gas temperatures are controlled by suitable intercooling between catalyst stages. The Knietsch type affords of course the more positive control of the course of the reaction but the converters are complicated and expensive to build and maintain, and present considerable difficulties in charging and removing the catalyst.

The Grillo converter, on the other hand, has the advantage of simplicity in design and construction and is easy to charge and discharge but the catalyst temperature is not positively controlled and consequently such systems are subject to very definite limitations in output. With the older platinum contact masses, for example the platinized magnesium sulphate catalyst usually employed in such converters, this problem of control was facilitated by reason of the low overload capacity of the catalyst, for loadings in excess of 135 liters per hour per 200 c. c. of catalyst produced a marked falling off in conversion and a consequent reduction in the catalyst temperature. By suitably proportioning the amount of catalytic material in each of the Grillo layers to the strength and rate of flow of the reaction gases it was possible to design a converter that operated satisfactorily, and in the main this has been the method generally employed in such converters.

According to the present invention converter systems are employed in which the simplicity and ease of construction of the Grillo type converter is maintained, but means are provided for positive cooling of the last catalyst layer in order to insure a proper completion of the reaction with a consequent improvement in the yields. The invention is based on the known fact that the oxidation of $SO_2$ to $SO_3$ is a reversible reaction, producing almost 100% yields of $SO_3$ at temperatures of 400–430° C. but tending to run in the opposite direction when higher temperatures are employed. For this reason, the controlling factor in the production of satisfactory conversion efficiencies from a given converter system is the last catalyst layer, for if the catalyst in this layer is present in sufficient amounts and is sufficiently active to bring the reaction to completion a controlled temperature of 400–430° C. will produce high yields irrespective of other temperatures existing in earlier catalyst layers or converters of the series.

It is also known that the temperatures which are necessary in the last catalyst layer of the system are too low to produce satisfactory reduction velocities for the converter system as a whole for the reason that the reaction velocity is approximately doubled for every 10° rise in temperature and a higher temperature has to be maintained in the first catalyst layers where the $SO_2$ gases are strongest and the most vigorous reaction takes place, in order to convert the major part of the sulphur dioxide in a converter of reasonable size. In my prior Patent, No. 1,660,511, dated February 28, 1928, I have described converter systems in which this higher temperature is controlled by heat exchange elements sufficiently powerful to permit loadings far in excess of those normally used for commercial use, thus permitting much larger outputs from a given sized converter.

By the present invention this higher temperature is maintained, not by the controlling action of heat exchange elements but by the principles employed in the operation of a Grillo converter, that is to say, by suitable entrance temperature and intercooling of the reaction gases and by suitable proportioning of the amount of catalyst and thickness of the catalyst layers to the speed of the reaction gases. In this manner I have found that a suitable elevated temperature can be maintained in the first catalyst layers of the converter system without danger of overheating, and since the last catalyst layer or converter is positively controlled high yields are obtained with an installation much simpler in design than those of my prior patent above referred to. This type of installation can of course be used with SO₂ gases from any source but is particularly suited for comparatively impure gases such as smelter gases, SO₂ gases from the burning of iron sulphide produced in the iron oxide boxes of gas purification plants, the burning of low grade iron sulphide and copper sulphide ores and the like, for in such cases the preliminary catalyst layers perform the additional function of filtering entrained dust particles from the gases and do not easily become clogged because they can be readily removed and shifted.

Although the converter systems of the present invention are excellently suited for platinum catalysts, and although the advantages enumerated are readily obtained with such contact masses, the invention presents an added advantage of being excellently suited for the modern, highly active vanadium catalysts described in the prior patent of Jaeger et al, No. 1,657,754, and my prior Patents Nos. 1,675,308, 1,675,309, 1,741,310, 1,694,123, and 1,885,833. Catalysts of this type are impervious to the poisons for platinum catalysts which are ordinarily contained in gases of the type above enumerated, and present the added advantage that they are much more highly active than platinum catalysts and will stand greater overloads. The use of such highly active catalysts in a converter of the layer type was previously considered impossible because of the danger of overheating but by proportioning the amount of catalyst in each layer to the reaction speed and to the speed of the gases passing therefrom, combined with intercooling as described in my co-pending application Serial No. 430,129 filed February 20, 1930, now Patent No. 1,945,811 this problem has been solved and the advantages of the high activity and resistance to poisoning of such catalysts are readily obtained in the converter systems of the present invention.

An added advantage of the present invention, when the highly active vanadium catalysts are used, consists in the use of the overload capacity of such catalysts in order to obtain the high reaction velocities in the first catalyst layers which are necessary to obtain high outputs from the converter system. When such catalysts are used in an ordinary converter of the layer type, not only is it necessary to use a carefully limited amount of catalyst to avoid overheating and consequent deterioration of the contact mass, but it is also necessary to keep the loadings sufficiently low so that the temperatures in the last converter layer will not rise above the optimum for maximum conversion. With the present invention, loadings sufficient to raise the temperature of the first catalyst layer as high as 600° C. may be used, even though temporary overloads sufficient to produce a temperature of 650° C. are encountered for short periods of time, and the enormous reaction velocity obtained at these temperatures serves to increase greatly the total output of the converter, while the positive control of the last catalyst layer insures sufficiently high conversion efficiencies. It will thus be seen that outputs and conversions approximating those obtained with the more intricate design of my prior Patent No. 1,660,511 are obtained by the simplified construction and operation of the present invention.

A few typical converter systems will be described in greater detail in conjunction with the accompanying drawings, but it is to be understood that these diagrammatic figures are for purposes of illustration only and do not limit the possibilities of the invention. The drawings are in part diagrammatic, features of construction and insulation, automatic temperature indicators, and suitable proportioning of the number of cooling elements and the size of the apparatus having been eliminated or altered for clearness of description.

In the drawings:

Figs. 1 and 2 illustrate simple converter types in which the various catalyst layers are enclosed in a single shell, the temperature of the final layer in Fig. 1 being controlled by an independent cooling gas such as steam, waste gases and the like and the temperature control in Fig. 2 being effected by the incoming reaction gases themselves.

Figs. 3 and 4 show systems in which the temperature of the last catalyst layer is controlled by the burner gases and in which partly reacted gases from the last Grillo stage are subjected to intercooling, thus insuring an absolutely uniform temperature in the last stage. In Fig. 3 gases from the intermediate heat exchanger are fed directly into the final catalyst stage, while in Fig. 4 an independent stage is inserted which not only generates additional heat and permits a lower inlet temperature of the burner gases but also acts as a dust filter.

Referring to Fig. 1, the converter consists of an outer shell 1 with top and bottom pieces 2 and 3 and inlet 4 and outlet 5 for the burner gases. Three uncooled Grillo catalyst layers are shown, the catalyst 6 being retained on supporting screens or trays 7 and baffles 8 being provided to deflect the gases against the converter shell and thus produce an intercooling. This intercooling may be to any desired extent, as is customary in converters of this type, and if necessary additional intercoolers may be provided between each step as is well known in the art.

The final catalyst layer 9, retained by a bottom screen 10, is positively cooled by double countercurrent heat exchange elements 11 embedded therein. These elements consist of outer, closed-end tubes 12 within which are mounted concentric open-end tubes 13, the closed and open end tubes respectively being mounted in tube sheets 14 and 15. The space or other supporting means 14 and 15. The space between the upper and lower tube sheets forms an inlet chamber 16 for the incoming cooling gas, while an outlet chamber for these gases is provided between the lower tube sheet 15 and the bottom piece 3 of the converter. The ends of the heat exchange elements extend into the space above the level of the final catalyst layer as shown, in order to serve as positive cooling means for the gases leaving the last uncooled Grillo catalyst layer and at the same time to preheat the cooling gas to avoid overcooling of the final catalyst layer.

In operation, the SO₂ gases enter this converter through the first catalyst layer 6, in which by reason of their high SO₂ content they attain their highest temperature and consequently their greatest reaction speed. The gases from this layer are deflected by the baffle 8 against the converter shell 1, a thorough mixing and cooling action being thus obtained, and then pass through the second Grillo layer 6, which also operates at high temperature and produces high reaction velocities. These two catalyst layers are operated without attempting to attain high percentage conversion, their main function being to produce a high reaction velocity and thus convert the major portion of the $SO_2$ gases into $SO_3$ in as short a time as possible. The third uncooled catalyst layer 6 operates on the same principle but by reason of the smaller amounts of $SO_2$ in the gases entering this stage, the temperatures are somewhat lower. Gases leaving the third stage 6 then come into contact with the tubes of the double countercurrent heat exchange tubes 11 where they are rapidly cooled, the ends of these tubes being the area where the most effective heat exchange takes place. The partially cooled gases then pass through the last catalyst layer 9, which is positively controlled by the embedded heat exchange elements and the temperature of which is not permitted to rise above the optimum for maximum yields of sulphur trioxide. In this catalyst layer the remaining portion of the $SO_2$ in the gases is converted into $SO_3$, and since the temperature of the catalyst is maintained at the optimum point for this purpose there is no tendency for the reaction to run in the opposite direction. The $SO_3$ gases leaving the converter through the outlet 5 are passed to suitable coolers and absorbers as is customary in the contact sulphuric acid process.

The converter of Fig. 2 consists, as in Fig. 1, of a converter shell 1, top and bottom pieces 2 and 3, and screens or trays 7 and 10 for retaining catalyst material in the uncooled and cooled catalyst layers. No means for the circulation or recirculation of an independent cooling medium are provided, since the $SO_2$ gases entering through the inlet 4 are themselves passed through the heat exchange elements embedded in the final catalyst layer. These heat exchange elements preferably consist, as in Fig. 1, of outer, closed-end tubes 12 into which are concentrically fitted open-end tubes 13, the respective sets of tubes being mounted in tube sheets 18 and 19. The tube sheet 19 is similar to the tube sheet 15 in Fig. 1, but tube sheet 18 is provided with a central opening 20 through which gases from the heat exchangers 11 are passed into the central pipe 21, which extends the entire length of the converter and opens into a bottom chamber 22. From this chamber the preheated reaction gases pass through the first uncooled catalyst layer 23, are then deflected by the baffle 24 against the walls of the converter shell and then pass through the second uncooled catalyst layer 25. The gases from this catalyst layer in which the major part of the $SO_2$ has been converted to $SO_3$ but which are at too high a temperature for completion of the reaction, are then distributed by means of a second baffle 26 through the final catalyst layer 27, in which the reaction is brought to completion as in the system of Fig. 1.

In Fig. 3, two separate converter shells are shown although it is apparent that the separate converters can be housed in a single converter shell if desired. The burner gases enter this converter system through the heat exchange elements 31 of the final catalyst layer where they are partially heated, then pass through a separate intercooler 32 between the last uncooled catalyst and the final positively cooled converter 33, and are then admitted to the first uncooled layer 33. From this layer they pass, as in Fig. 1, around a baffle 34 and through the second and third uncooled catalyst layers 35 and 36 in which the major portion of the sulphur dioxide is oxidized at high velocities. The gases then pass through the intercooler 32, where their temperature is materially lowered by heat exchange with the incoming burner gases and are then conducted through the final converter or catalyst layer 37 which is positively cooled and which brings the reaction to completion. The heat exchange elements in the final converter 37 are similar to those described in Fig. 2 and the intercooler 32 may be of any approved type, but preferably consists of double countercurrent heat exchange elements 30, the concentric outer and inner tubes being mounted in tube sheets 39 and 40 respectively, with horizontal baffles 41 extending across the outer tubes to insure an extended passage of the incoming burner gases.

The converter system of Fig. 4 is somewhat similar to that of Fig. 3 with the exception that a valved bypass 51 is provided in order to enable greater flexibility in temperature control. The burner gases enter the converter system at 52, pass through the heat exchange elements 53 of the final catalyst stage 54, pass into the outlet chamber 55 of these heat exchangers and are then led to the first uncooled catalyst layer 56 through the pipes 57 and 58 and internal heat exchanger 59. This internal heat exchanger consists of upper and lower tube sheets 60 and 61 in which are mounted respectively open and closed end tubes 62 and 63, the gases entering through inlet 64 in the top piece 65 of the converter and exiting at 66 into the pipe 58. By suitable adjustment of the valve 67 any desired amount of reaction gases may be by-passed around this internal heat exchanger, thus providing an additional means of temperature control in the converter system.

The gases entering the bottom of the converter are passed through the uncooled catalyst layers 56 and 68, are then passed over the tubes of heat exchanger 59 and then pass through another uncooled catalyst layer 69 in which, by reason of their lowered temperature, the reaction may be brought still further towards completion. The gases leaving the catalyst layer 69 are then passed through the final converter or catalyst layer 55, in which the reaction is maintained at its optimum temperature for complete conversion by the embedded elements of the heat exchanger 53.

In the above drawings, double countercurrent heat exchange elements have been illustrated, since this is the preferred type of cooling element and has many advantages over the use of straight tubes, cooling coils, or cooling elements of other types. It is to be understood, however, that the invention is not limited to the use of this type of cooler or heat exchanger, but on the contrary other types may be used with success in many installations.

The principles of the present invention have been more particularly described in connection with the oxidation of sulphur dioxide to sulphur trioxide, but it will be apparent that apparatus similar to that described and embodying the same principles can be used for other purposes. For example, the apparatus is well suited for high pressure catalyses such as the production of formaldehyde, methyl alcohol and methane in stages from oxides of carbon and hydrogen, in which the preliminary stages can be effected by catalyst layers without positive cooling and the reaction brought to completion at its most favorable temperature in the final, positively cooled catalyst layer. Similarly, the apparatus may be used for other reductions and hydrogenations such as the reduction of aldehydes and ketones to alcohols, nitrocompounds to amines such as nitrobenzene to aniline, of acids such as phthalic anhydride to phthalide, and hydrogenations such as the hydrogenation of phenol to hexahydrophenol, benzene to cyclohexane, naphthalene to tetraline and decaline and the like. Other inorganic reactions such as the ammonia synthesis, the production of hydrocyanic acid from ammonia and oxides of carbon, and the oxidation of ammonia to oxides of nitrogen can also be carried out in a similar manner.

What is claimed as new is:

1. A process of producing sulphur trioxide which comprises bringing about reaction between sulphur dioxide and oxygen in a plurality of stages, at least one stage having no positive temperature control other than the reaction gas itself flowing through the layer and the temperature of the last stage being positively and directly controlled by circulating a cooling gas, other than the gases issuing from the preceding reaction stage, through heat exchange elements embedded in the catalyst of said final stage.

2. A process according to claim 1, in which reaction in the last stage is effected in the presence of a non-platinum contact mass having an overload capacity in excess of that of standard platinum catalysts.

3. A process according to claim 1, in which reaction in all the stages is effected in the presence of a non-platinum contact mass having an overload capacity in excess of that of standard platinum catalysts.

4. In a converter system, the improvement which comprises in combination at least one catalyst layer or converter having no positive cooling means other than the reaction gas itself flowing through the layer followed by a final catalyst layer having heat exchange elements embedded therein and capable of providing a cooling effect sufficiently powerful to maintain the layer at temperatures suitable for optimum conversion efficiencies, said heat exchange elements being connected to a source of cooling gas other than the gases which have passed through the preceding catalyst layer.

5. In a converter system, the improvement which comprises in combination at least one catalyst layer or converter having no positive cooling means other than the reaction gas itself flowing through the layer followed by a positively and directly cooled catalyst layer having double counter-current heat exchange elements embedded therein, said heat exchange elements being connected to a source of cooling gas other than the gases which have passed through the preceding catalyst layer.

6. A converter system comprising in combination at least one catalyst layer or converter having no positive cooling means other than the reaction gas itself, a final catalyst layer provided with embedded cooling means sufficiently powerful to maintain the layer at temperatures suitable for optimum conversion efficiencies, a heat exchanger preceding the final catalyst layer in the direction of gas flow, means for admitting unreacted gases to the inlet of said heat exchanger, and means for passing gases from the outlet of said heat exchanger to the said uncooled catalyst layer.

ALPHONS O. JAEGER.